United States Patent
Wakai

Patent Number: 5,096,061
Date of Patent: Mar. 17, 1992

[54] THICKENED TAPE FOR HOLDING NAILS HAVING IMPROVED NAIL-SUPPORTING LOWER WALL

[75] Inventor: Takao Wakai, Higashiosaka, Japan

[73] Assignee: Wakai & Co., Ltd., Osaka, Japan

[21] Appl. No.: 617,887

[22] Filed: Nov. 26, 1990

[30] Foreign Application Priority Data

Jan. 23, 1990 [JP] Japan ................... 2-5258
Apr. 27, 1990 [JP] Japan ................... 2-45312

[51] Int. Cl.⁵ ............................................. B65D 85/24
[52] U.S. Cl. ................................. 206/347; 206/485; 227/136
[58] Field of Search ............... 206/338, 343, 345, 346, 206/347, 485, 820; 227/136

[56] References Cited

U.S. PATENT DOCUMENTS

| | | | |
|---|---|---|---|
| 569,886 | 10/1896 | Raymond, II | 206/347 |
| 1,337,212 | 4/1920 | Elliott | 206/347 |
| 2,771,610 | 11/1956 | Smith | 206/347 X |
| 3,438,487 | 4/1969 | Gallee et al. | 206/347 |
| 3,450,255 | 6/1969 | Mosetich | 206/347 |
| 3,841,472 | 10/1974 | Fuller et al. | 206/485 X |
| 3,885,669 | 5/1975 | Potucek | 206/338 |
| 3,915,367 | 10/1975 | Potucek | 227/136 |
| 4,349,106 | 9/1982 | Bögel | 206/347 |
| 4,358,014 | 11/1982 | Potucek | 206/347 |
| 4,383,608 | 5/1983 | Potucek | 206/347 |
| 4,606,455 | 8/1986 | Grikis et al. | 206/347 |
| 4,684,022 | 8/1987 | Potucek | 206/347 |

Primary Examiner—Bryon P. Gehman
Attorney, Agent, or Firm—Wenderoth, Lind & Ponack

[57] ABSTRACT

A tape for holding nails has a side wall and upper and lower walls extending from both longitudinal edges of the side wall to the same side. The upper wall is formed with notches which open to the longitudinal side edge of the upper wall to hold nail shanks at their upper part near their heads. A fold-back wall is integral with the lower wall and folded back so as to oppose the top surface of the lower wall. The lower wall and the fold-back wall are formed with notches which open to the fold-back edge between the lower wall and the fold-back wall to hold the nail shanks at the lower part neat their tips. Instead of providing the fold-back wall, the top surface of the lower wall may be partially thickened at least at inner end portions of the notches.

5 Claims, 2 Drawing Sheets

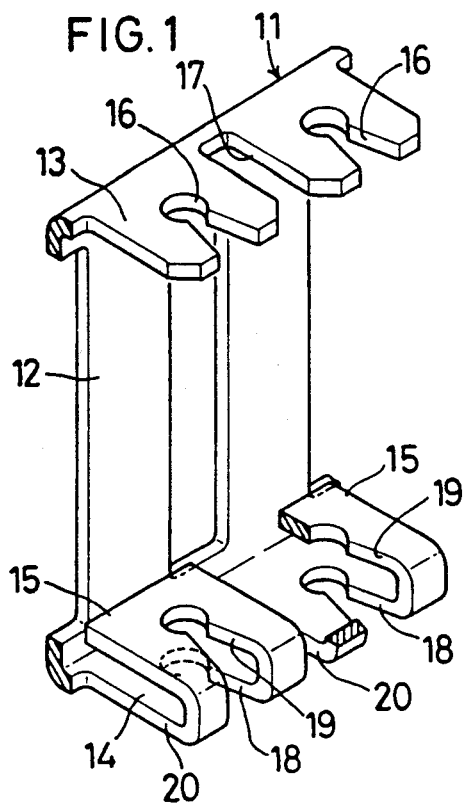
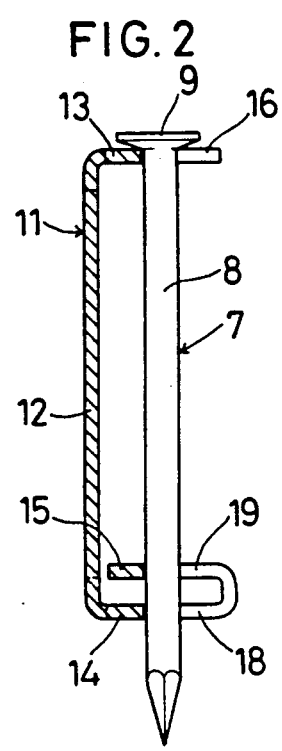
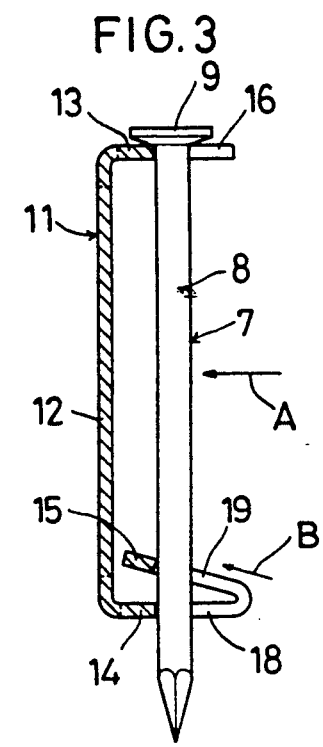
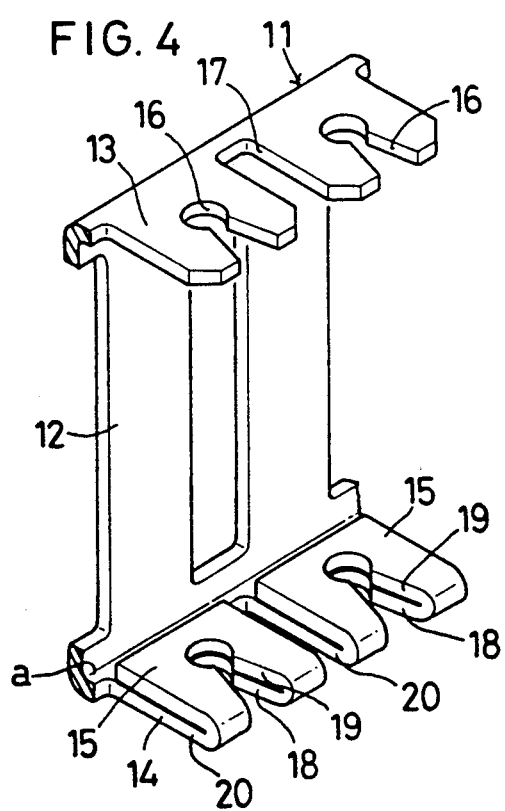
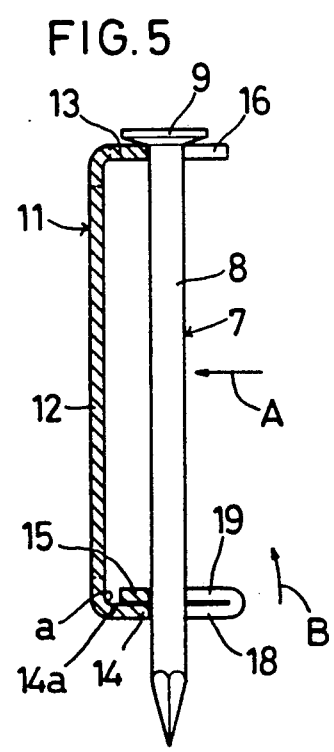

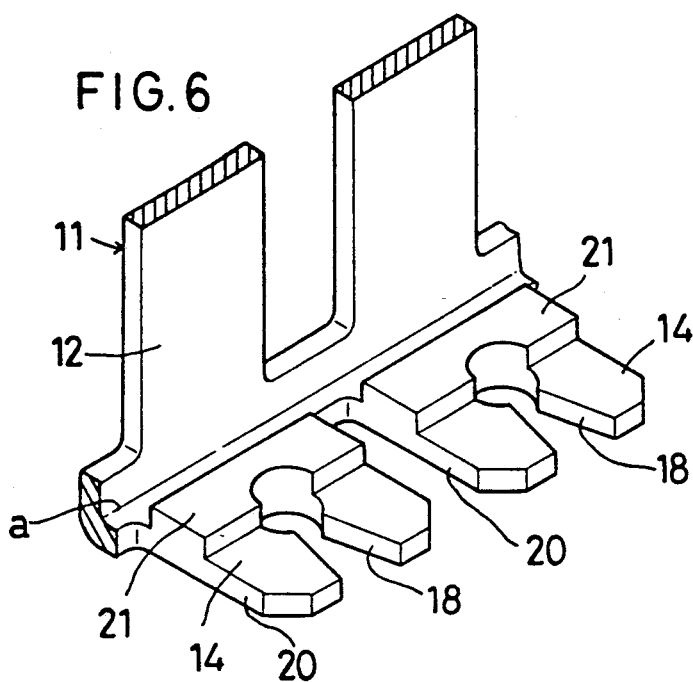
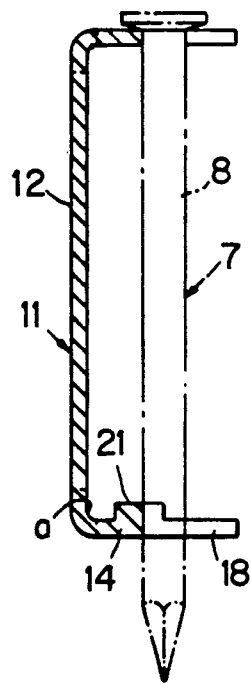
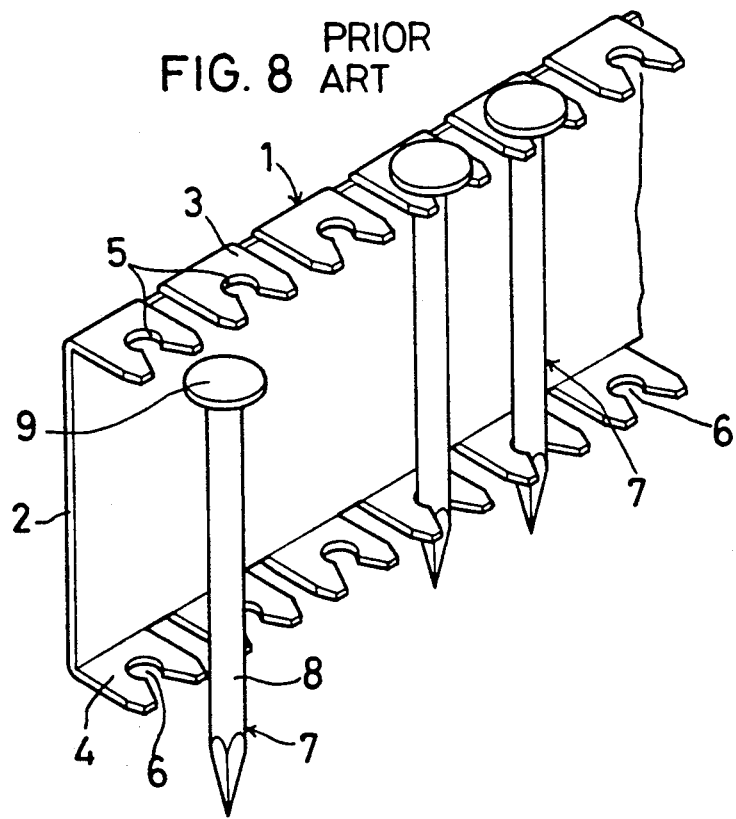

THICKENED TAPE FOR HOLDING NAILS HAVING IMPROVED NAIL-SUPPORTING LOWER WALL

BACKGROUND OF THE INVENTION

This invention relates to a tape for holding nails, and more specifically to a tape for holding a plurality of nails at predetermined intervals so that they can be nailed one after another by use of, e.g., a pneumatic nailing machine.

FIG. 8 shows a prior art nail holding tape 1 for use in driving nails with a nailing machine. A plurality of nails 7 are held on the tape 1 at equal intervals.

This prior art tape 1 is in the form of a thin sheet of synthetic resin having its upper and lower edge portions bent in the same direction to form upper and lower walls 3 and 4 opposed to each other. Thus, the tape has a U-shaped cross section. The upper and lower walls 3 and 4 are formed with notches 5 and 6, respectively, located opposite to each other and aligned in the longitudinal direction of the tape 1 at equal intervals. They are open to the outer edge of the upper and lower walls 3 and 4 to receive the shanks 8 of the nails 7.

To hold the nails 7 with the tape 1, upper parts of the shanks 8 near their heads 9 and lower parts near their tips are pushed into the notches 5 in the upper wall 3 and the notches 6 in the lower wall 4, respectively, through their somewhat narrowed openings.

Since such a prior art tape 1 is made by bending the longitudinal side edges of a thin web of sheet made of synthetic resin so that it will have a U-shaped cross section, the upper and lower walls 3 and 4 can be spread apart rather easily. Thus, if an external pressure acts on the nails 7 carried by the tape 1 during transportation or its operation in such a direction as to push them toward the side wall 2, the upper and lower walls 3 and 4 will be urged to spread apart.

When such an external pressure acts on the nails 7, the upper wall 3 is prevented from being spread apart because it abuts the heads 9 of the nails 7, allowing the shanks 8 to be held by the upper wall 3.

In contrast, the lower wall 4 is free to spread apart. Thus, when an external pressure acts on the nails 7, the lower wall 4 will incline downwards slipping along the shanks 8 toward the tips of the nails and might move out of engagement with the shanks 8. In this state, the shanks 8 are not supported near the tips thereof. Thus, it will be impossible to drive the nails with a nailing machine.

One possible way to prevent a separation of the nail from the lower wall 4 is to bond the lower wall 4 to the shanks 8 with an adhesive after inserting the nails 7. But the application of adhesive requires much time and trouble and is not economical.

SUMMARY OF THE INVENTION

It is an object of the present invention to provide an improved nail holding tape which obviates the above-said shortcomings, and whose lower wall is prevented from slipping from the nails even if the nails are subjected to external pressure, so that the nails are prevented from disengaging from the lower wall.

In accordance with the present invention, there is provided a tape for holding nails comprising a side wall, upper and lower walls extending from both longitudinal edges of the side wall to the same side, the upper wall being formed with notches which open to the longitudinal side edge of the upper wall to hold nail shanks at their upper part near their heads, and a fold-back wall integral with the lower wall and folded back so as to oppose to the top surface of the lower wall, the lower wall and the fold-back wall being formed with notches which open to the fold-back edge between the lower wall and the fold-back wall to hold the nail shanks at the lower part near their tips.

The nails held on the tape have the upper part of their shanks nearer to their heads supported in the notches formed in the upper wall and the lower part of the shanks nearer to their tips supported in the notches formed in the lower wall and the fold-back wall.

Since the fold-back wall is located over the lower wall to support the shanks, even if external pressure acts on the nails in such a direction as to press them toward the side wall so that the lower wall tends to pivot toward the tip of the shanks, the fold-back wall is also pressed toward the side wall, so that it functions in such a way as to lift the side edge of the lower wall. In other words, the fold-back wall serves to prevent the lower wall from pivoting. Thus the lower portions of the shanks near the tips can be held in position by the lower wall and the fold-back wall and the nails are prevented from coming off the tape.

BRIEF DESCRIPTION OF THE DRAWINGS

Other features and objects of the present invention will become apparent from the following description taken with reference to the accompanying drawings, in which:

FIG. 1 is a perspective view of the first embodiment of this invention;

FIG. 2 is a vertical sectional side view showing the same in which the nails are held in position;

FIG. 3 is a vertical sectional side view showing another example of the fold-back wall;

FIG. 4 is a perspective view of the second embodiment of this invention;

FIG. 5 is a vertical sectional side view of the same showing the nails held in position;

FIG. 6 is a perspective view of the third embodiment;

FIG. 7 is a vertical sectional view of the same; and

FIG. 8 is a perspective view of a prior art tape.

DETAILED DESCRIPTION OF THE PREFERRED EMBODIMENTS

The first embodiment of this invention will be described with reference to FIGS. 1-3.

As shown in the figures, a tape 11 is in the form of a thin sheet made of synthetic resin. It comprises a strip-like side wall 12, upper and lower walls 13 and 14 formed by bending the upper and lower edges of the side wall 12 to the same side so as to oppose to each other, and a fold-back wall 15 integral with the lower wall 14 and located over the lower wall 14.

The upper wall 13 is formed with notches 16 aligned at equal intervals in the lengthwise direction of the tape and opening to the side edge of the upper wall 13 to receive and hold the shanks 8 of the nails 7 at portions near their heads 9. Further, cutouts 17 are formed in the upper wall 13 between the adjacent notches 16 to extend from the side edge of the upper wall 13 toward the side wall 12.

The lower wall 14 and the fold-back wall 15 are formed with notches 18 and 19, respectively, aligned longitudinally at equal intervals so as oppose to the respective notches 16 in the upper wall 13. They open to the portion connecting the lower wall 14 to the fold-back wall 15 to receive and hold the shanks 8 of the nails 7 at portions near their tips. Further, cutouts 20 are formed in the lower wall 14 and the fold-back wall 15 between the adjacent notches 18 and 19 to extend from the connecting portion toward the side wall 12.

Each set of the notches 16, 18 and 19 formed, respectively, in the upper wall 13, the lower wall 14 and the fold-back wall 15, are aligned with one another. Each of them comprises a circular hole and a nail-guiding cutout continuous with the circular hole.

In the example shown in FIGS. 1 and 2, the fold-back wall 15 extends parallel to the lower wall 14. But it may extend obliquely upwardly from the side edge of the lower wall 14, as shown in FIG. 3. Each set of the notches 16, 18 and 19 may be aligned obliquely to hold the nail 7 obliquely.

In operation, as shown in FIGS. 2 and 3, the shanks 8 of the nails 7 are inserted at their upper portions near the heads 9 into the notches 16 in the upper wall 13 and at their lower portions near the tips into the notches 18 and 19 in the lower wall 14 and the fold-back wall 15. Thus the nails 7 can be held by the tape 11 at equal intervals.

When external pressure acts in the direction A in FIG. 3 on the nails 7 thus held by the tape 11, the upper and lower walls 13 and 14 tend to spread apart.

But the upper wall 13 is prevented from spreading apart because it abuts the heads 9. On the other hand, the fold-back wall 15 is pressed by the nails toward the side wall 12 as shown by arrow B in FIG. 3, tending to lift up the side edge of the lower wall 14. This uplift force balances with the force to spread apart the lower wall 14, thus preventing the lower wall from slipping toward the tip of the shanks 8.

Thus, the nails 7 can be held reliably by the lower wall 14 and the fold-back wall 15 without the fear of coming off the tape 11. Thus the nails can be driven in continuously.

FIGS. 4-7 show other embodiments of this invention.

As shown in the figures, a tape 11 is in the form of a thin sheet made of synthetic resin. It comprises a strip-like side wall 12, and upper and lower walls 13 and 14 formed by bending the upper and lower edges of the side wall 12 to the same side so as to oppose to each other. The upper wall 13 is formed at equal intervals in the lengthwise direction of the tape with notches 16 for retaining the shanks 8 of the nails 7 at their upper portions near the heads 9. For this purpose, the notches 16 open to the side edge of the upper wall 13. Further, cutouts 17 are formed in the upper wall 13 between the adjacent notches 16, extending from the side edge of the upper wall 13 toward the side wall 12.

The lower wall 14 is formed at longitudinally equal intervals with notches 18 for retaining the shanks 8 of the nails 7 at their lower portions near the tips. They are located opposite the notches 16 in the upper wall 13. The notches 18 open to the side edge of the lower wall 14. The lower wall is further formed with cutouts 20 between the adjacent notches 18 so as to extend from the side edge of the lower wall 14 toward the side wall 12.

The respective notches 16 and 18 formed in the upper and lower walls 13 and 14 are aligned with each other and each comprises a circular hole adapted to resiliently engage the shanks 8 and a nail-guiding cutout extending divergently outwardly from the circular hole.

The lower wall portion of the tape 11 is thicker at least at the inner end of the notches 18 than at the remaining parts thereof.

Different ways to provide the larger thickness parts of the lower wall portion are shown in the drawings.

In the first example shown in FIGS. 4 and 5, a fold-back wall 15 formed integrally with the side edge of the lower wall 14 is laid on the lower wall and fixed thereto by means of adhesive or by welding to increase the thickness.

The fold-back wall 15 is slightly shorter than the lower wall 14 and is formed with notches 19 communicating with the notches 18 at the fold-back edge. By folding back the fold-back wall 15 and fixing it together with the lower wall 14, the notches 18 and 19 will overlap each other and open at the side edge of the lower wall 14.

Accordingly, the thickness of parts of the the lower wall portion is greater than that of merely the lower wall 14 by the thickness of the fold-back wall 15.

Because the fold-back wall 15 is slightly shorter than the lower wall 14, a thin part 14a having the thickness of only the lower wall 14 is provided along the side wall 12. The parts having an increased thickness extend from near the side wall 12 to the terminal end of the lower wall 14 so as to surround the notches 18.

In the second example shown in FIGS. 6 and 7, the lower wall 14 is integrally provided on the top surface thereof at the side nearer to the inner end of the notches 18 with protrusions 21 aligned in the longitudinal direction of the lower wall 14. Thus, the thickness of the lower wall portion is greater at those parts defining the inner ends of notches 18.

Although not shown, other means may be employed to increase the thickness of the lower wall portion. For example, separate narrow members may be bonded on top of the lower wall 14 or the wall thickness may be greater only at a part surrounding the notches. In any case, the structure and shape of the lower wall portion are not limited to those shown in the drawings. The only requirement is that the lower wall portion has to protrude upwardly at the inner end of the notches 18.

In this embodiment, as shown in FIG. 5, the shanks 8 of the nails 7 are inserted at top portions near the heads 9 into the notches 16 formed in the upper wall 13 and at lower portions near the tips into the notches 18 in the lower wall 14 to secure the nails 7 to the tape 11 at equal intervals.

If an external pressure acts on the nails 7 carried by the tape in such a direction as to push them toward the side wall 12 as shown by arrow A in FIG. 5, this pressure is supported by upper and lower walls 13 and 14.

In this state, the upper wall 13 is prevented from spreading apart from the lower wall 14 because it abuts the heads 9.

On the other hand, the lower wall 14 supports the shanks 8, which are being pushed by the external pressure. At that time, the parts having a greater wall thickness also serve to support the shanks. Thus the supporting range of the shanks 8 extends upwardly beyond the top surface of the lower wall 14.

As already described, when an external pressure acts on the nails 7 supported by the lower wall 14 in such a direction as to push the nails toward the side wall 12, the lower wall 14 tends to pivot downwards about the bending point a between the lower wall 14 and the side wall 12 (FIG. 5).

But by providing the thick-walled parts on the lower wall portion to support the shanks 8, these supporting parts are located above the bending point a between the lower wall 14 and the side wall 12. Thus, as shown by arrow B in FIG. 5, the lower wall 14 is subjected to a force tending to pivot it upwardly.

As a result, the force tending to pivot the lower wall 14 downwardly balances with the force tending to pivot it upwardly. The lower wall 14 is thus prevented from slipping toward the tips of the shanks 8.

Thus, the lower wall 14 can hold the nails reliably without the fear of the nails 7 coming off the tape. This permits a continuous, reliable nail operation.

What is claimed is:

1. A tape for holding nails, said tape comprising a side wall having longitudinally extending top and bottom portions, an upper wall extending to one side of said side wall from the top portion thereof, said upper wall having a terminal end defined opposite the top portion of said side wall, and said upper wall defining a plurality of notches extending therein and open at the terminal end thereof, a lower wall extending to said one side of said side wall from the bottom portion thereof so as to oppose said upper wall, said lower wall having a terminal end defined opposite the bottom portion of said side wall, and said lower wall also having a top surface facing towards said upper wall, and a folded-back wall integral with said bottom wall and extending from the terminal end thereof back towards said side wall over the top surfaces of said lower wall, said lower wall and said folded-back wall defining a plurality of notches extending therein and open at the terminal end of said lower wall.

2. A tape for holding nails as claimed in claim 1, wherein said folded-back wall has a bottom surface spaced from the top surface of said lower wall.

3. A tape for holding nails as claimed in claim 1, wherein said folded-back wall has a bottom surface contacting the top surface of said lower wall.

4. A tape for holding nails, said tape comprising a side wall having longitudinally extending top and bottom portions, an upper planar wall extending to one side of said side wall from the top portion thereof, said upper wall having a terminal end defined opposite the top portion of said side wall, and said upper planar wall defining a plurality of notches extending therein and open at the terminal end thereof, and a lower wall portion extending to said one side of said side wall from the bottom portion thereof so as to oppose said upper planar wall, said lower wall portion having a terminal end defined opposite the bottom portion of said side wall, said lower wall portion defining a plurality of notches therein open at the terminal end thereof and extending toward said side wall to respective inner ends of the notches, and said lower wall portion having both first parts defining at least the inner ends of said notches and remaining parts located adjacent where said lower wall portion extends from said side wall, said first parts having a thickness, as taken in a direction perpendicular to the opposing surfaces of said upper planar wall and said lower wall portion, which is greater than the thickness, as taken in said direction, of said remaining parts.

5. A tape for holding nails as claimed in claim 4, wherein said first parts of a greater thickness extend closer toward said upper planar wall compared to said remaining parts.

* * * * *